(12) United States Patent
Kim et al.

(10) Patent No.: US 11,519,457 B2
(45) Date of Patent: Dec. 6, 2022

(54) AIR FOIL BEARING AND COMPRESSOR INCLUDING THE SAME

(71) Applicants: Hyundai Motor Company, Seoul (KR); Kia Motors Corporation, Seoul (KR)

(72) Inventors: Tae Young Kim, Suwon-si (KR); Byung Hwa Oh, Yongin-si (KR); Jong Myeong Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/180,462

(22) Filed: Feb. 19, 2021

(65) Prior Publication Data
US 2022/0082127 A1 Mar. 17, 2022

(30) Foreign Application Priority Data
Sep. 14, 2020 (KR) .................. 10-2020-0117800

(51) Int. Cl.
*F16C 17/04* (2006.01)

(52) U.S. Cl.
CPC ........ *F16C 17/042* (2013.01); *F16C 2360/00* (2013.01)

(58) Field of Classification Search
CPC .................... F16C 17/042; F16C 2360/00
See application file for complete search history.

(56) References Cited

U.S. PATENT DOCUMENTS

| 6,158,892 A * | 12/2000 | Stewart .................. F16C 17/042 384/105 |
| 10,557,497 B1 * | 2/2020 | Jones ....................... F16C 41/00 |
| 2016/0195128 A1 * | 7/2016 | Omori ................... F16C 17/042 384/105 |

FOREIGN PATENT DOCUMENTS

| CN | 111120503 A | * | 5/2020 | ............ F16C 17/042 |
| CN | 111637151 A | * | 9/2020 | |
| JP | 60172721 A | * | 9/1985 | |
| KR | 20010063914 A | * | 7/2001 | |
| KR | 2019086878 A | * | 7/2019 | ............ B21D 22/04 |

OTHER PUBLICATIONS

Machine Translation of JP S60-172721 (Year: 1985).*

* cited by examiner

*Primary Examiner* — Alan B Waits
(74) *Attorney, Agent, or Firm* — Morgan, Lewis & Bockius LLP (57) ABSTRACT

An air foil bearing and a compressor including the same, may include a beam plate provided in a lower portion thereof; a shim sheet stacked on the beam plate, and partially covering a top surface of the beam plate; and a top foil stacked on the shim sheet, wherein one side of the beam plate is fixed, and the other side of the beam plate is movable in a vertical direction thereof.

17 Claims, 7 Drawing Sheets

AIR FOIL BEARING AND COMPRESSOR INCLUDING THE SAME

CROSS-REFERENCE TO RELATED APPLICATION

The present application claims priority to Korean Patent Application No. 10-2020-0117800, filed on Sep. 14, 2020, the entire contents of which is incorporated herein for all purposes by this reference.

BACKGROUND OF THE INVENTION

Field of the Invention

The present invention relates to an air foil bearing having a novel structure and a compressor including the same.

Description of Related Art

A bearing is a machine element that supports a moving portion (rotating body) to make the rotating body rotate smoothly. There are various types of bearings such as ball bearings, journal bearings, and air foil bearings. The air foil bearing includes a base plate, a bump foil, and a top foil, and is characterized by forming an air film between the rotating body and the air foil bearing by the rotation of the rotating body, thereby performing cooling and supporting the rotating body. Such air foil bearings are used for a variety of industrial applications. For example, the air foil bearing may be used in a compressor to supply compressed air to fuel cells.

According to the related art, when a pressure around the air foil bearing changes due to the air flow by the rotation of the rotating body, the top foil pressurizes the bump foil, and accordingly, the shape of the pressurized bump foil changes. Accordingly, when the rotating body stops rotating, the bump foil returns to its original shape. That is, the bump foil has an elastic structure that reversibly changes shape depending on external forces.

To the present end, according to the related art, the bump foil has an embossed structure with an uneven surface. Such a structure of the bump foil to create the elastic structure acts as a factor that increases the time required to manufacture the air foil bearing.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air foil bearing capable of achieving excellent performance, even with a simpler structure than the related art, and a compressor including the same.

According to various aspects of the present invention, an air foil bearing may include a beam plate provided in a lower portion thereof, wherein one side of the beam plate may be fixed, and the other side of the beam plate may be movable in a vertical direction thereof.

The air foil bearing may further include a shim sheet stacked on the beam plate, and partially covering a top surface of the beam plate.

The air foil bearing may further include a top foil stacked on the shim sheet.

The shim sheet may include a plurality of shim sheets, and the plurality of shim sheets may be provided along the circumference of the top surface of the beam plate.

The beam plate may have a circular outer circumference, and a through hole may be formed in a central area of the beam plate. The beam plate may include: a peripheral area forming the circumference of the beam plate, and extending in a circumferential direction of the beam plate; a spaced area provided between the through hole and the peripheral area, and spaced from the peripheral area in a radial direction of the beam plate; and a connection area connecting the peripheral area and the spaced area.

The shim sheet may include: a first area provided on the peripheral area of the beam plate; a second area connected to the first area, and provided on the spaced area and the connection area of the beam plate; and a third area connected to the second area, and provided on the spaced area.

The third area may include a plurality of projections extending in the circumferential direction thereof.

The plurality of projections may be spaced from each other in the radial direction thereof.

Among the plurality of projections, a projection located outward in the radial direction may be longer than a projection located inward in the radial direction thereof.

A width of the connection area in the circumferential direction may be the same as a width of a portion of the second area provided between the peripheral area and the spaced area in the circumferential direction thereof.

The beam plate may have a thickness of 0.8 mm to 3.5 mm.

The top foil may include: a peripheral portion provided on the peripheral area of the beam plate; an inner portion spaced apart inwardly from the peripheral portion in the radial direction thereof, and provided on the spaced area of the beam plate; and a first connection portion connecting the peripheral portion and the inner portion, and provided on the connection area of the beam plate.

The inner portion may include a plurality of internal members spaced from each other in the circumferential direction thereof, and the top foil may further include a second connection portion connecting the plurality of internal members to each other.

A width of the first connection portion in the circumferential direction may be less than a width of the connection area in the circumferential direction thereof.

According to various aspects of the present invention, a compressor may include: a housing; and an air foil bearing attached to a surface of the housing, wherein the air foil bearing includes a beam plate partially attached to the surface of the housing, and the beam plate includes: a fixed end area fixed to the housing; and a free end area moving relative to the housing.

The compressor may further include a shim sheet facing the housing with the beam plate interposed therebetween, and partially covering a top surface of the beam plate.

The compressor may further include a top foil facing the beam plate with the shim sheet interposed therebetween.

The beam plate may have a circular outer circumference, and a through hole may be formed in a central area of the beam plate. The beam plate may include: a peripheral area forming the circumference of the beam plate, and extending in a circumferential direction of the beam plate; a spaced area provided between the through hole and the peripheral area, and spaced from the peripheral area in a radial direction of the beam plate; and a connection area connecting the peripheral area and the spaced area. The fixed end area may correspond to the peripheral area, and the free end area may correspond to the spaced area and the connection area.

The shim sheet may include: a first area facing the peripheral area of the beam plate; a second area connected to the first area, and facing the spaced area and the connection area of the beam plate; and a third area connected to the second area, and facing the spaced area.

The compressor may further include a rotation portion facing one surface of the air foil bearing opposing the other surface of the air foil bearing facing the housing, wherein the rotation portion may face the spaced area.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an air foil bearing and a compressor including the same according to exemplary embodiments of the present invention will be described in detail with reference to the accompanying drawings.

Air Foil Bearing

Figure 1:
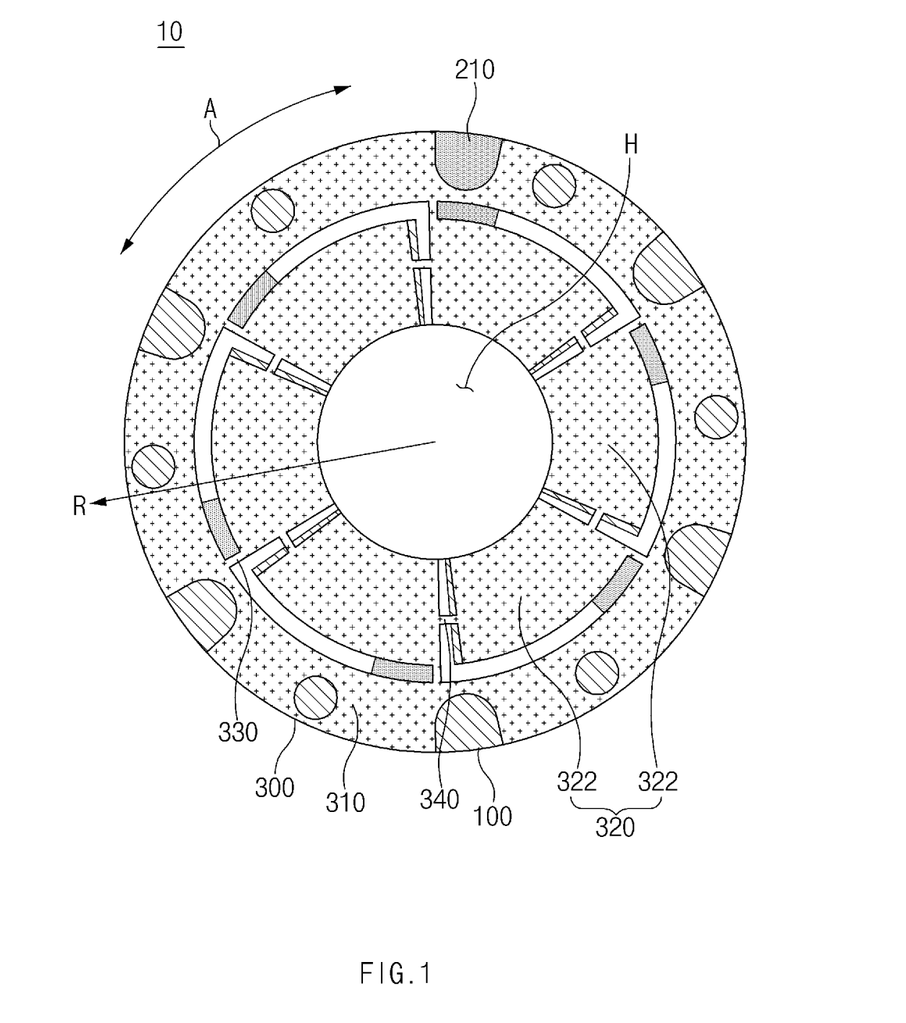
FIG. 1 illustrates a plan view of a stacked structure of an air foil bearing according to various exemplary embodiments of the present invention.
Figure 2:
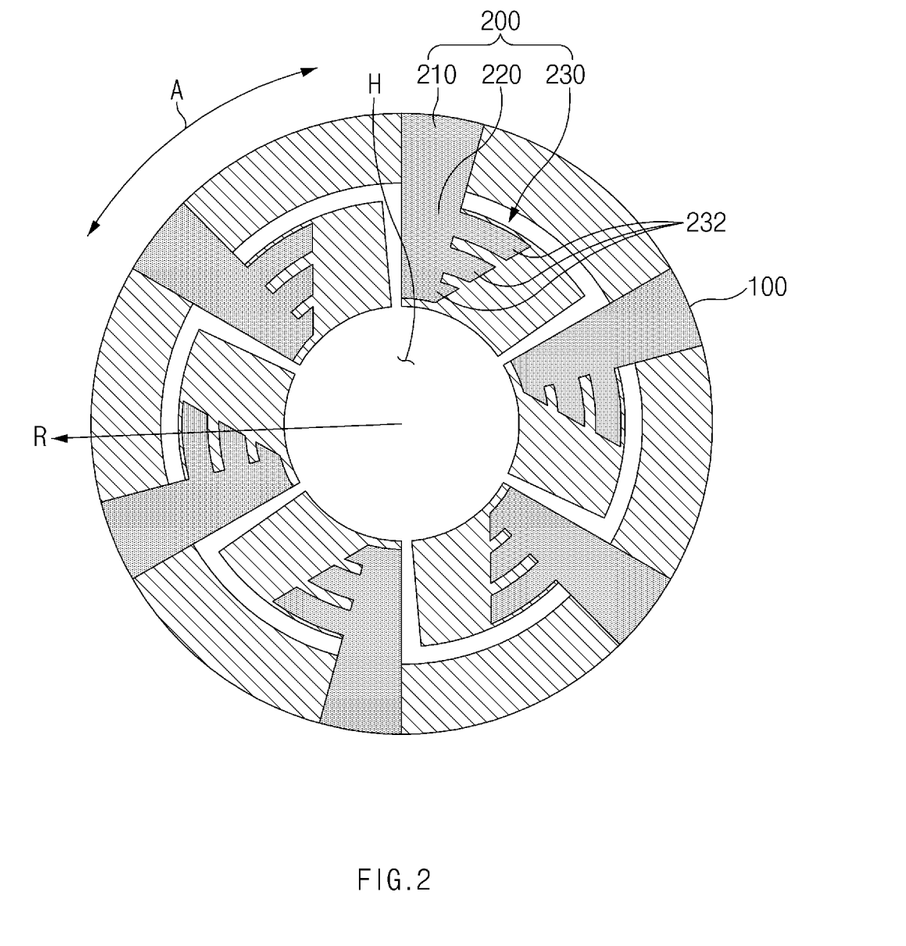
FIG. 2 illustrates a plan view of a stacked structure of a beam plate and a shim sheet in an air foil bearing according to various exemplary embodiments of the present invention.
Figure 3:
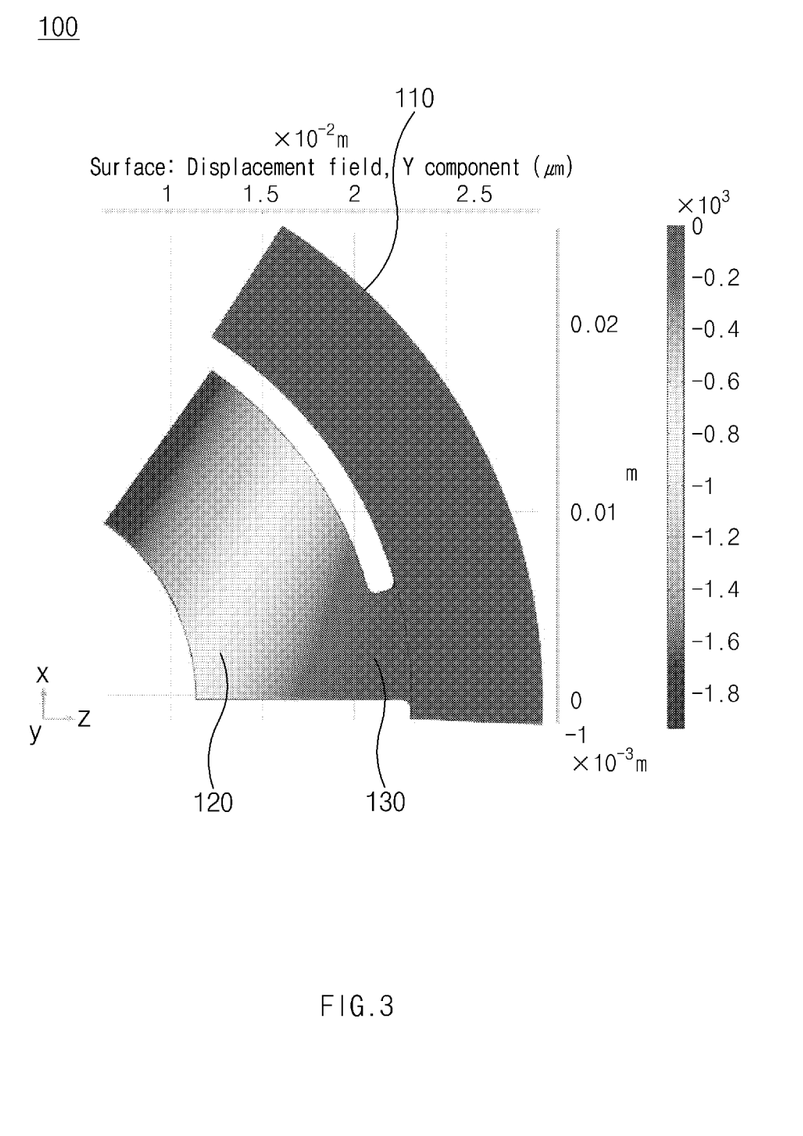
FIG. 3 illustrates a structure of partial areas of a beam plate and a displacement (in colors) for each area of the beam plate in an air foil bearing according to various exemplary embodiments of the present invention.

FIG. 1 illustrates a plan view of a stacked structure of an air foil bearing according to various exemplary embodiments of the present invention, and FIG. 2 illustrates a plan view of a stacked structure of a beam plate and a shim sheet in an air foil bearing according to various exemplary embodiments of the present invention. FIG. 3 illustrates a structure of partial areas of a beam plate and a displacement for each area of the beam plate in an air foil bearing according to various exemplary embodiments of the present invention.

Referring to FIG. 1, FIG. 2, and FIG. 3, an air foil bearing 10 according to various exemplary embodiments of the present invention may have a structure in which a plurality of elements is vertically stacked. The air foil bearing 10 may include a beam plate 100 provided in a lower portion of the air foil bearing, a shim sheet 200 stacked on the beam plate 100 and partially covering a top surface of the beam plate 100, and a top foil 300 stacked on the shim sheet 200. That is, the air foil bearing 10 according to various exemplary embodiments of the present invention may have the stacked structure in which the beam plate 100, the shim sheet 200, and the top foil 300 are stacked sequentially from bottom to top. Meanwhile, the beam plate 100, the shim sheet 200, and the top foil 300 forming the air foil bearing 10 according to various exemplary embodiments of the present invention may all have a smooth surface. Thus, to manufacture the air foil bearing 10 according to various exemplary embodiments of the present invention, a separate process for forming an uneven surface, that is, an embossed structure may not be required.

Here, it may be determined by the naked eye whether the element has a smooth surface or not.

As may be seen from the names of the elements, the shim sheet 200 and the top foil 300 may be significantly thinner than the beam plate 100. Thus, compared to stiffness of the beam plate 100, the shim sheet 200 and the top foil 300 may have significantly low physical stiffness. To be described below, the beam plate 100 may be bent reversibly depending on a pressure change around the beam plate. To the present end, the beam plate 100 may have a thickness of 0.8 mm to 3.5 mm. When the thickness of the beam plate 100 is less than 0.8 mm, the stiffness of the beam plate 100 may be too low, which may cause a problem in durability of the air foil bearing 10. When the thickness of the beam plate 100 exceeds 3.5 mm, the beam plate 100 may fail to be sufficiently bent depending on the pressure change.

Meanwhile, as illustrated in FIG. 1 and FIG. 2, the beam plate 100 and the top foil 300 may have a circular outer circumference. A through hole H may be formed in a central area of the beam plate 100 and the top foil 300. Furthermore, each of the beam plate 100 and the top foil 300 may be a single element.

On the other hand, the shim sheet 200 may include a plurality of shim sheets as illustrated in FIG. 2. For example, FIG. 2 illustrates six shim sheets 200 spaced equidistant around the circumference of the top surface of the beam plate 100. The plurality of shim sheets 200 may be spaced from each other in a circumferential direction A of the beam plate.

Referring to FIG. 2 and FIG. 3, each of the beam plate 100, the shim sheet 200, and the top foil 300 forming the air foil bearing 10 may be divided into a plurality of areas. Hereinafter, the plurality of areas for the beam plate 100, the shim sheet 200, and the top foil 300 will be described below.

Referring to FIG. 2 and FIG. 3, the beam plate 100 may include a peripheral area 110 forming the outer circumference of the beam plate and extending in the circumferential direction A of the beam plate, a spaced area 120 provided between the through hole H and the peripheral area 110 and spaced from the peripheral area 110 in a radial direction R of the beam plate, and a connection area 130 connecting the peripheral area 110 and the spaced area 120.

Furthermore, referring to FIG. 2 and FIG. 3, the shim sheet 200 may include a first area 210 provided on the peripheral area 110 of the beam plate 100, a second area 220 connected to the first area 210 and provided on the spaced area 120 and the connection area 130 of the beam plate 100, and a third area 230 connected to the second area 220 and provided on the spaced area 120.

Here, the third area 230 may include a plurality of projections 232 extending in the circumferential direction A. Here, the plurality of projections 232 may be spaced from each other in the radial direction R. For example, FIG. 2 illustrates three projections 232 arranged in the third area 230 of each of the plurality of shim sheets 200 in a manner that the projections 232 are spaced from each other in the radial direction R.

Referring to FIG. 2, the plurality of projections 232 provided in the third area 230 of the shim sheet 200 may have different lengths. That is, a length of one projection among the plurality of projections 232 in the circumferential direction A may be different from a length of another projection among the plurality of projections 232 in the circumferential direction A.

According to various exemplary embodiments of the present invention, among the plurality of projections 232, a projection located away from the center portion (outward) in the radial direction R may be longer than a projection located inward in the radial direction R. Thus, as the projections are located farther away from the center portion in the radial direction R, their lengths may be increased.

In an exemplary embodiment of the present invention, the projection located away from the center portion (outward) in the radial direction R may be proportionally longer than a projection located inward in the radial direction R.

Furthermore, referring to FIG. 1, the top foil 300 may include a peripheral portion 310 provided on the peripheral area 110 of the beam plate 100, an inner portion 320 spaced apart inwardly from the peripheral portion 310 in the radial direction R and provided on the spaced area 120 of the beam plate 100, and a first connection portion 330 connecting the peripheral portion 310 and the inner portion 320 and provided on the connection area 130 of the beam plate 100. Here, the inner portion 320 may include a plurality of internal members 322 spaced from each other in the circumferential direction A. For example, FIG. 1 illustrates six internal members 322 forming the inner portion 320. As the peripheral portion 310 is provided on the first area 210 of the shim sheet 200 and the peripheral area 110 of the beam plate 100, it may face the first area 210 of the shim sheet 200 and the peripheral area 110 of the beam plate 100. Furthermore, the inner portion 320 may face the second area 220 and the third area 230 of the shim sheet 200 and the spaced area 120 of the beam plate 100. Furthermore, the number of internal members 322 may be the same as the number of shim sheets 200.

Furthermore, the top foil 300 may further include a second connection portion 340 connecting the plurality of internal members 322 to each other. That is, according to various exemplary embodiments of the present invention, the peripheral portion 310 and the inner portion 320, which take up most of the size of the top foil 300, may be spaced from each other in the radial direction R, and the internal members 322 of the inner portion 320 may be spaced from each other in the circumferential direction A, but the first connection portion 330 connecting the peripheral portion 310 to the inner portion 320 and the second connection portion 340 connecting the plurality of internal members 322 to each other may allow the top foil 300 to form a unitary one-piece structure.

Referring to FIG. 1, FIG. 2, and FIG. 3, a width of the connection area 130 of the beam plate 100 in the circumferential direction A may be the same as a width of a portion of the second area 220 of the shim sheet 200 provided between the peripheral area 110 and the spaced area 120 in the circumferential direction A. Thus, as illustrated in FIG. 1, the entirety of the connection area 130 may overlap the second area 220.

Referring to FIG. 1, FIG. 2, and FIG. 3, a width of the first connection portion 330 of the top foil 300 in the circumferential direction A may be less than the width of the connection area 130 in the circumferential direction A, and the width of the first connection portion 330 of the top foil 300 in the circumferential direction A may be less than the width of the portion of the second area 220 provided between the peripheral area 110 and the spaced area 120 in the circumferential direction A. Thus, as illustrated in FIG. 1, when the air foil bearing 10 according to various exemplary embodiments of the present invention is viewed from the top in an axial direction of the air foil bearing 10, the first connection portion 330 may only cover the portion of the second area 220.

Compressor

Figure 4:
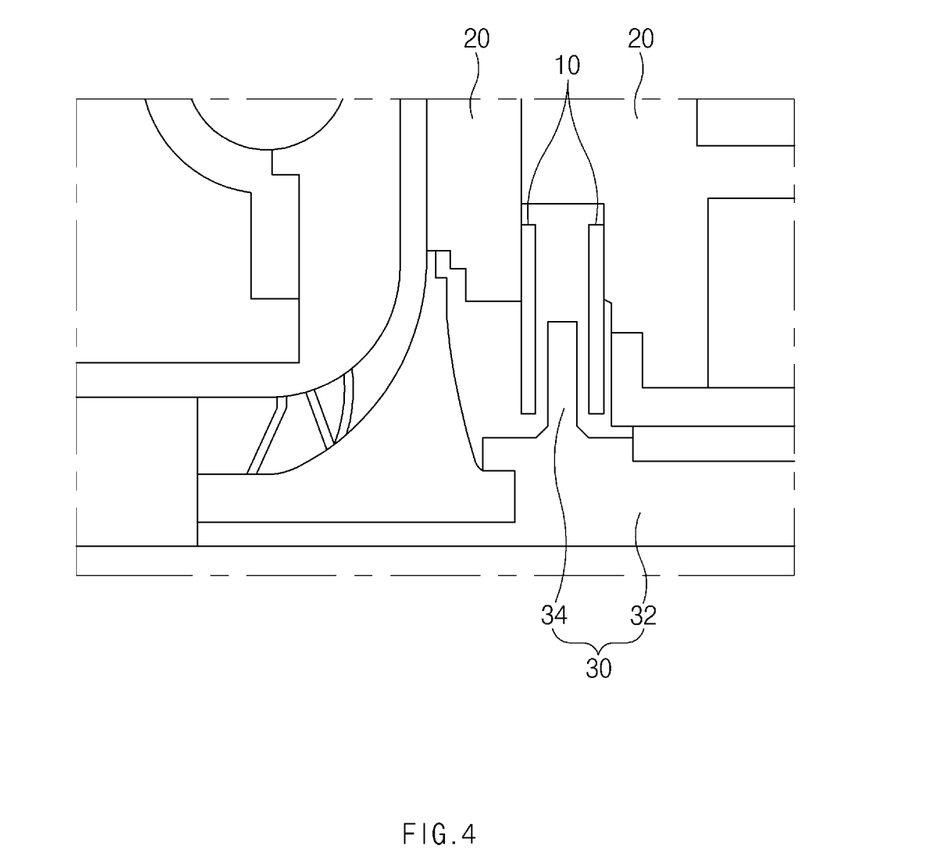
FIG. 4 illustrates a cross-sectional view of a structure of a compressor according to various exemplary embodiments of the present invention.
Figure 5:
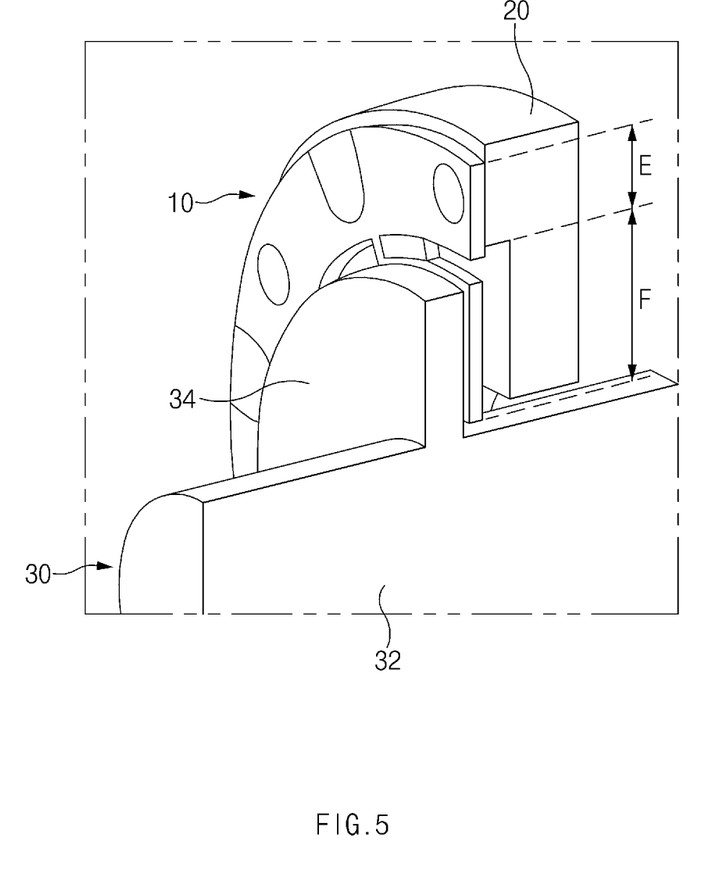
FIG. 5 illustrates a cross-sectional view of the arrangement of an air foil bearing, a housing, and a rotation portion in a compressor according to various exemplary embodiments of the present invention.

FIG. 4 illustrates a cross-sectional view of a structure of a compressor according to various exemplary embodiments of the present invention, and FIG. 5 illustrates a cross-sectional view of the arrangement of an air foil bearing, a housing, and a rotation portion in a compressor according to various exemplary embodiments of the present invention.

As illustrated in FIG. 4, a compressor according to various exemplary embodiments of the present invention may include a housing 20 forming at least a portion of the exterior of the compressor, and the air foil bearing 10 attached to one surface of the housing 20. FIG. 4 illustrates the air foil bearing 10 attached to an interior surface of the housing 20.

Referring to FIG. 1, FIG. 2, and FIG. 3, the air foil bearing 10 may include the beam plate 100 partially attached to the surface of the housing 20, the shim sheet 200 facing the housing 20 with the beam plate 100 interposed therebetween and partially covering the top surface of the beam plate 100, and the top foil 300 facing the beam plate 100 with the shim sheet 200 interposed therebetween. For example, one or more through holes may be formed in the peripheral area 110 (see FIG. 1) of the beam plate 100, and bolts may be fastened to the through holes so that the beam plate 100 and the housing 20 may be connected to each other.

Based on the above statements, the air foil bearing and the compressor according to exemplary embodiments of the present invention will be described below.

In the air foil bearing 10 according to various exemplary embodiments of the present invention, one side of the beam plate 100 may be fixed, and the other side of the beam plate 100 may be movable in an axial direction of the bean plate 100 in FIG. 1.

In the compressor according to various exemplary embodiments of the present invention as illustrated in FIG. 5, the beam plate 100 may include a fixed end area E fixed to the housing 20 and a free end area F moving relative to the housing 20 in an axial direction of the beam plate 100. The fixed end area E may correspond to the peripheral area 110 (see FIG. 3) of the beam plate 100, and the free end area F may correspond to the spaced area 120 (see FIG. 3) and the connection area 130 (see FIG. 3) of the beam plate 100. Meanwhile, FIG. 5 illustrates a state in which the free end area F of the beam plate 100 faces the housing 20. However, the housing 20 may not face the free end area F of the beam plate 100. For example, the housing 20 may only face the fixed end area E of the beam plate 100.

Referring to FIG. 4 and FIG. 5, the compressor according to various exemplary embodiments of the present invention may further include a rotation portion 30 facing one surface of the air foil bearing 10 opposing the other surface of the air foil bearing 10 facing the housing 20. As illustrated in FIG. 5, the rotation portion 30 may face the spaced area 120 of the beam plate 100 (see FIG. 3) with the shim sheet and the top foil interposed therebetween.

The rotation portion 30 may include a shaft 32 provided on the center portion thereof, and an extension portion 34 extending from the shaft 32 in a radial direction of the shaft. The spaced area 120 (see FIG. 3) may face the extension portion 34.

Meanwhile, as illustrated in FIG. 5, the rotation portion 30 may be spaced from the peripheral area 110 (see FIG. 3) in a radial direction of the rotation portion. The extension portion 34 of the rotation portion 30 may be spaced from the peripheral area 110 of the beam plate.

Furthermore, as illustrated in FIG. 5, the free end area F of the beam plate 100 may be spaced from the shaft 32 in the radial direction of the rotation portion 30. Thus, a predetermined empty space may be formed between the free end area F and the shaft 32. Furthermore, the free end area F of the beam plate 100 may be spaced from the housing 20 in a longitudinal direction of the rotation portion 30. Thus, a predetermined empty space may be formed between the free end area F and the housing 20. In the present case, the free end area F may be bent smoothly toward the housing 20 (a right direction in FIG. 5).

Figure 6:
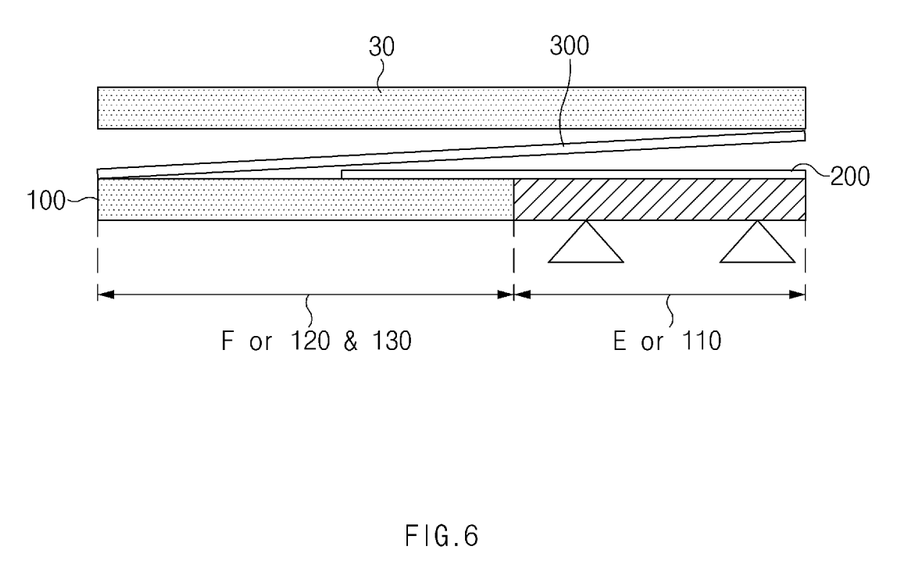
FIG. 6 illustrates a side sectional view of the shape of an air foil bearing when a rotation portion does not rotate in a compressor according to various exemplary embodiments of the present invention.
Figure 7:
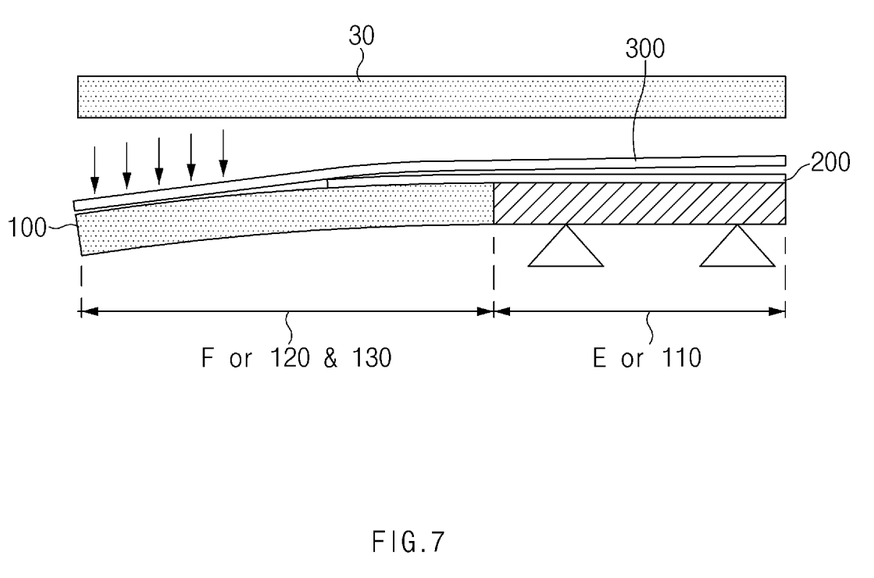
FIG. 7 illustrates a side sectional view of the shape of an air foil bearing when a rotation portion rotates in a compressor according to various exemplary embodiments of the present invention.

FIG. 6 illustrates a side sectional view of the shape of an air foil bearing when a rotation portion does not rotate in a compressor according to various exemplary embodiments of the present invention, and FIG. 7 illustrates a side sectional view of the shape of an air foil bearing when a rotation portion rotates in a compressor according to various exemplary embodiments of the present invention.

Hereinafter, referring to FIG. 6 and FIG. 7, changes in shape of the air foil bearing will be described with respect to operating states of the compressor according to exemplary embodiments of the present invention.

When the rotation portion 30 of the compressor does not rotate, as illustrated in FIG. 6, the entire areas of the beam plate 100 of the air foil bearing may not be bent, and may be in parallel with the rotation portion 30.

When the rotation portion 30 of the compressor rotates, air may flow between the rotation portion 30 and the air foil bearing, and accordingly a pressure between the rotation portion 30 and the air foil bearing may increase. Thus, the air foil bearing may receive a force in a direction opposite in a direction in which the air foil bearing faces the rotation portion 30 (a downward direction in FIG. 7).

However, as described above, the peripheral area 110 of the beam plate 100 may be the fixed end area E which is attached to the housing 20, and the spaced area 120 and the connection area 130 of the beam plate 100 may be the free end area F which is not attached to the housing 20. Thus, the shape of the fixed end area E may not change even when the air foil bearing receives the force in the direction opposite to the direction in which the air foil bearing faces the rotation portion 30, but the shape of the free end area F may be bent. However, due to the stiffness of the beam plate 100 itself, the free end area F may only be bent to a point where a force balance is formed between the pressure of the air flow and an elastic restoring force of the beam plate 100. Accordingly, when the rotation portion 30 of the compressor stops rotating, it may return to an original state thereof as illustrated in FIG. 6 due to the elasticity of the beam plate 100.

Without forming an embossed structure with an uneven surface for a reversible shape change caused by an external force, the air foil bearing according to various exemplary embodiments of the present invention may function properly by dividing the beam plate 100 into the fixed end area and the free end area while using the stiffness of the beam plate 100 itself. Meanwhile, the compressor according to various exemplary embodiments of the present invention may be a type of compressor supplying compressed air to fuel cells.

As set forth above, according to exemplary embodiments of the present invention, the air foil bearing capable of achieving excellent performance, even with a simpler structure than the related art, and an apparatus/device provided with such a novel air foil bearing may be manufactured.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air foil bearing apparatus comprising:
   a beam plate provided in a predetermined portion of the air foil bearing; and
   a shim sheet stacked on the beam plate, and partially covering a top surface of the beam plate,
   wherein a first side of the beam plate is stationary,
   wherein a second side of the beam plate is movable with respect to the first side in an axial direction of the beam plate, wherein the shim sheet includes a plurality of shim sheets,
wherein the plurality of shim sheets is provided along a circumference of the top surface of the beam plate, and
wherein the plurality of shim sheets are separated and spaced from each other in a circumference of the beam plate.

2. The air foil bearing apparatus according to claim 1, further including a top foil stacked on the shim sheet.

3. The air foil bearing apparatus according to claim 2, wherein the beam plate has a circular outer circumference,
wherein a through hole is formed in a central area of the beam plate, and
wherein the beam plate further includes:
   a peripheral area forming the circular outer circumference of the beam plate, and extending in a circumferential direction of the beam plate;
   a spaced area provided between the through hole and the peripheral area, and spaced from the peripheral area in a radial direction of the beam plate; and
   a connection area connecting the peripheral area and the spaced area.

4. The air foil bearing apparatus according to claim 3, wherein the shim sheet includes:
   a first area provided on the peripheral area of the beam plate;
   a second area connected to the first area, and provided on the spaced area and the connection area of the beam plate; and
   a third area connected to the second area, and provided on the spaced area.

5. The air foil bearing apparatus according to claim 4, wherein the third area includes a plurality of projections extending in the circumferential direction of the beam plate.

6. The air foil bearing apparatus according to claim 5, wherein the plurality of projections is spaced from each other in the radial direction of the beam plate.

7. The air foil bearing apparatus according to claim 6, wherein, among the plurality of projections, a projection located outward in the radial direction is longer than a projection located inward in the radial direction.

8. The air foil bearing apparatus according to claim 4, wherein a width of the connection area in the circumferential direction is a same as a width of a portion of the second area provided between the peripheral area and the spaced area in the circumferential direction.

9. The air foil bearing apparatus according to claim 4, wherein the top foil includes:
   a peripheral portion provided on the peripheral area of the beam plate;
   an inner portion spaced apart inwardly from the peripheral portion in the radial direction, and provided on the spaced area of the beam plate; and
   a first connection portion connecting the peripheral portion and the inner portion, and provided on the connection area of the beam plate.

10. The air foil bearing apparatus according to claim 9, wherein the inner portion includes a plurality of internal members spaced from each other in the circumferential direction, and
wherein the top foil further includes a second connection portion connecting the plurality of internal members to each other.

11. The air foil bearing apparatus according to claim 9, wherein a width of the first connection portion in the circumferential direction is less than a width of the connection area in the circumferential direction.

12. The air foil bearing apparatus according to claim 1, wherein the beam plate has a thickness of 0.8 mm to 3.5 mm.

13. A compressor apparatus, comprising:
a housing; and
an air foil bearing apparatus attached to a surface of the housing,
wherein the air foil bearing apparatus includes a beam plate partially attached to the surface of the housing and a shim sheet facing the housing with the beam plate interposed between the shim sheet and the housing, and partially covering a top surface of the beam plate,
wherein the beam plate includes:
   a fixed end area fixed to the housing; and
   a free end area connected to the fixed end area and movable relative to the housing,
wherein the shim sheet includes a plurality of shim sheets,
wherein the plurality of shim sheets is provided along a circumference of the top surface of the beam plate, and
wherein the plurality of shim sheets are separated and spaced from each other in a circumference of the team plate.

14. The compressor apparatus according to claim 13, further including a top foil facing the beam plate with the shim sheet interposed between the top foil and the beam plate.

15. The compressor apparatus according to claim 14,
wherein the beam plate has a circular outer circumference,
wherein a through hole is formed in a central area of the beam plate,
wherein the beam plate further includes:
   a peripheral area forming the circular outer circumference of the beam plate, and extending in a circumferential direction of the beam plate;
   a spaced area provided between the through hole and the peripheral area, and spaced from the peripheral area in a radial direction of the beam plate; and
   a connection area connecting the peripheral area and the spaced area,
wherein the fixed end area corresponds to the peripheral area, and
wherein the free end area corresponds to the spaced area and the connection area.

16. The compressor apparatus according to claim 15, wherein the shim sheet includes:
   a first area facing the peripheral area of the beam plate;
   a second area connected to the first area, and facing the spaced area and the connection area of the beam plate; and
   a third area connected to the second area, and facing the spaced area.

17. The compressor apparatus according to claim 15, further including:
   a rotation portion facing a first surface of the air foil bearing apparatus opposite to a second surface of the air foil bearing apparatus facing the housing,
wherein the rotation portion faces the spaced area.

* * * * *